US011314732B2

(12) United States Patent
Mahadik et al.

(10) Patent No.: US 11,314,732 B2
(45) Date of Patent: Apr. 26, 2022

(54) DATABASE MIGRATION TECHNIQUE

(71) Applicant: International Business Machines Corporation, Armonk, NY (US)

(72) Inventors: Vineet P. Mahadik, Round Rock, TX (US); Ashley Kristin Silva, Durham, NC (US); Frank Isaacs, Wake Forest, NC (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 16/599,829

(22) Filed: Oct. 11, 2019

(65) Prior Publication Data

US 2021/0109922 A1 Apr. 15, 2021

(51) Int. Cl.
G06F 16/23 (2019.01)
G06F 16/21 (2019.01)
G06F 3/06 (2006.01)

(52) U.S. Cl.
CPC .......... *G06F 16/2393* (2019.01); *G06F 3/067* (2013.01); *G06F 3/0617* (2013.01); *G06F 3/0647* (2013.01); *G06F 16/214* (2019.01)

(58) Field of Classification Search
CPC .... G06F 16/2393; G06F 16/214; G06F 3/067; G06F 3/0647; G06F 3/0617
USPC ....................................................... 707/609
See application file for complete search history.

(56) References Cited

U.S. PATENT DOCUMENTS

| 7,072,913 B2 * | 7/2006 | Jans .......................... G06F 9/52 |
| 8,055,635 B2 * | 11/2011 | Hsu ..................... G06F 16/2455 |
| | | 707/698 |
| 8,356,010 B2 * | 1/2013 | Driesen ................. G06F 16/214 |
| | | 707/624 |
| 8,938,425 B1 * | 1/2015 | Armangau ............ G06F 16/128 |
| | | 707/639 |

(Continued)

OTHER PUBLICATIONS

"A Method to Perform Version-to-Version Migration of Business Process Management (BPM) Deployment Environments Using Business Process Execution Language (BPEL) Runtime With Human Tasks", An IP.com Prior Art Database Technical Disclosure No. IPCOM000199928D, Sep. 21, 2010, 8 pps.

(Continued)

*Primary Examiner* — Phuong Thao Cao
(74) *Attorney, Agent, or Firm* — David K. Mattheis; Maeve M. Carpenter (57) ABSTRACT

One or more processors generate a view that identifies the data records of a first database having a back-level version. Instructions are received to migrate the data records from a back-level version to a new version of the data records. Responsive to receiving a query requesting data records of the first database, the version level of the requested data records is determined based on the generated view. Responsive to determining the requested data records are in the back-level version, a migration is performed on the requested data records including changes resulting in the new version of the requested data records. The requested data records are identified as changed to the new version of data records, and the new version of the requested data records are written to a pre-determined storage location and are provided to a requestor submitting the query.

20 Claims, 4 Drawing Sheets

(56) References Cited

U.S. PATENT DOCUMENTS

| | | | | |
|---|---|---|---|---|
| 8,943,032 | B1* | 1/2015 | Xu | G06F 16/119 |
| | | | | 707/698 |
| 8,996,490 | B1* | 3/2015 | Armangau | G06Q 30/02 |
| | | | | 707/705 |
| 9,152,659 | B2* | 10/2015 | Cline | G06F 16/214 |
| 10,037,689 | B2 | 7/2018 | Taylor | |
| 10,142,204 | B2 | 11/2018 | Nickolov et al. | |
| 10,416,919 | B1* | 9/2019 | Cai | G06F 3/0605 |
| 10,545,913 | B1* | 1/2020 | Liao | G06F 11/1435 |
| 10,649,952 | B1* | 5/2020 | Chakankar | G06F 16/1873 |
| 10,924,587 | B1* | 2/2021 | Chaudhuri | H04L 67/327 |
| 2002/0188625 | A1* | 12/2002 | Jans | G06F 9/52 |
| 2005/0283564 | A1* | 12/2005 | LeCrone | G06F 3/0689 |
| | | | | 711/100 |
| 2007/0239774 | A1* | 10/2007 | Bodily | G06F 16/214 |
| 2008/0005077 | A1* | 1/2008 | Eggebraaten | G06F 16/219 |
| 2008/0010325 | A1* | 1/2008 | Yamakawa | G06F 3/0647 |
| 2008/0147720 | A1* | 6/2008 | Allerton | G06Q 10/06 |
| 2009/0106285 | A1* | 4/2009 | Cheung | G06F 16/214 |
| 2009/0222691 | A1* | 9/2009 | Riemers | G06F 16/214 |
| | | | | 714/18 |
| 2010/0153341 | A1* | 6/2010 | Driesen | G06F 16/214 |
| | | | | 707/661 |
| 2012/0259810 | A1* | 10/2012 | Kopylovitz | G06F 16/214 |
| | | | | 707/609 |
| 2012/0278442 | A1* | 11/2012 | Saika | G06F 3/061 |
| | | | | 709/219 |
| 2013/0024634 | A1* | 1/2013 | Shitomi | G06F 16/119 |
| | | | | 711/162 |
| 2014/0279914 | A1* | 9/2014 | Bester | G06F 16/273 |
| | | | | 707/640 |
| 2015/0058289 | A1* | 2/2015 | Do | G06F 16/2386 |
| | | | | 707/613 |
| 2015/0363452 | A1* | 12/2015 | Tu | G06F 16/2329 |
| | | | | 707/638 |
| 2016/0072886 | A1* | 3/2016 | Lin | H04L 67/42 |
| | | | | 709/213 |
| 2016/0098443 | A1* | 4/2016 | Specht | G06F 8/656 |
| | | | | 707/634 |
| 2016/0140116 | A1* | 5/2016 | Li | G06F 16/214 |
| | | | | 707/609 |
| 2016/0170978 | A1* | 6/2016 | Michael | G06F 16/214 |
| | | | | 707/609 |
| 2016/0179840 | A1* | 6/2016 | Dani | G06F 16/1847 |
| | | | | 707/824 |
| 2016/0292152 | A1* | 10/2016 | Dennis | G06F 16/119 |
| 2017/0147371 | A1* | 5/2017 | Tsirkin | G06F 9/45558 |
| 2018/0052620 | A1* | 2/2018 | Driesen | G06F 3/067 |
| 2018/0329782 | A1* | 11/2018 | Kludy | G06F 11/1461 |
| 2019/0042595 | A1* | 2/2019 | Basham | G06F 16/162 |
| 2019/0205429 | A1* | 7/2019 | Lee | G06F 16/176 |
| 2019/0387065 | A1* | 12/2019 | Lau | G06F 16/214 |
| 2020/0028909 | A1* | 1/2020 | Ramasubramanian | G06F 16/214 |
| 2020/0065392 | A1* | 2/2020 | Shuma | G06F 16/214 |
| 2020/0089801 | A1* | 3/2020 | Patel | G06F 16/2343 |
| 2020/0104377 | A1* | 4/2020 | Earnesty, Jr | G06F 9/4843 |
| 2020/0387514 | A1* | 12/2020 | Stegmann | G06F 11/3419 |

OTHER PUBLICATIONS

"Method to Reduce the Time for Live Partition Migration Via Cooperative Approach by Database Manager", An IP.com Prior Art Database Technical Disclosure, IP.com No. IPCOM000218211D, IP.com Electronic Publication Date: May 28, 2012, 4 pps.

Barkan, "Large Scale NoSQL Database Migration Under Fire", AppsFlyer, Feb. 26, 2018, 16 pps., <https://medium.com/appsflyer/large-scale-nosql-database-migration-under-fire-bf298c3c2e47>.

Hauer, "Databases as a Challenge for Continuous Delivery", Java Ecosystem, Kotlin, Distributed Systems, Sociology of Software Development, Posted on Nov. 28, 2015. Updated on Jan. 20, 2019, 16 pps., <https://blog.philipphauer.de/databases-challenge-continuous-delivery/>.

Rait, "Continuous Delivery of Database Changes", FH JOANNEUM—University of Applied Sciences, University of Applied Sciences, Master Thesis, 69 pps., 2015.

Sadalage, "Migrations in NoSQL databases", Oct. 14, 2014, 7 pps., <http://sadalage.com/blog/2014/10/14/migrations-in-nosql-databases/>.

Sitaraman et al., "Test Automation Strategies in a Continuous Delivery Ecosystem", Oct. 2016, Cognizant 20-20 Insights, 6 pps.

* cited by examiner

DATABASE MIGRATION TECHNIQUE

FIELD OF THE INVENTION

The present invention relates generally to the field of data management, and more particularly to minimization of downtime of database migration.

BACKGROUND OF THE INVENTION

Despite efforts to accurately plan and design database storage, changes to the database are inevitable and will require a data migration at some point. Changes may be a simple addition of new columns to a table, or may be more complicated, involving renaming of columns, changing data format, or physical migration to a new storage platform. In some cases, migration is planned during a scheduled maintenance window in which access to database services is unavailable, but adequately communicated, not presenting major issues.

For other cases continuous database access and activity is required. For example, a continuous integration/continuous delivery (CI/CD) database environment provides continual availability as a requirement and planned maintenance windows are not an acceptable option, as significant efforts are taken to avoid downtime.

SUMMARY

Embodiments of the present invention disclose a method, computer program product, and system. The embodiments provide a method for minimizing downtime of a database migration, the method provides for one or more processors to generate a view that identifies data records of a first database corresponding to a back-level version of the data records. The one or more processors receive instructions to migrate the data records of the first database from the back-level version of the data records to a new version of the data records. The one or more processors receiving a query from an application requesting a first set of records of the data records of the first database. The one or more processors determine whether the requested first set of records have been migrated, resulting in a new version of the first set of records, based on the generated view. Responsive to determining the requested first set of records remain in the back-level version, the one or more processors perform a migration of the requested first set of records to include changes resulting in the new version of the first set of records. The one or more processors identify the requested first set of records as changed to the new version of the data records. The one or more processors write the new version of the first set of records to a pre-determined storage location and provide the requested first set of records to the application submitting the query.

DETAILED DESCRIPTION

Embodiments of the present invention recognize that applications with a database backend will inevitably require a data migration at some point. Migrations may be somewhat trivial, such as adding an additional column to a table or may be complex and involved such as significant format changes or renaming table columns. In some embodiments, data record migration of a database may involve physically moving data from one database to a distinct other database and may involve changes to the format or organization of the data. In some embodiments migration of data records may be distributed from an original database on a single storage unit to a plurality of storage devices within a cloud environment for greater capacity or may be migrated to operate on an enhanced platform. In other embodiments, data records are transformed into a structure, format, or include features resulting in a new version of the data records, stored in a designated location, which in some cases may be the original location of the data along with new version features.

Embodiments of the present invention recognize that some environments have minimal tolerance for loss of database availability, such as continuous integration/continuous delivery (CI/CD) environments, in which scheduled maintenance windows are often considered unacceptable. Migration techniques that perform bulk changes and/or moves of data code changes that continually require backward compatibility create development burdens and ultimately result in unyielding and unmanageable code.

Embodiments of the present invention provide a method, system, and product for performing a hybrid migration of data records coincidentally with application query requests, followed by a forced bulk migration of remaining back level data. In some embodiments, an accessor layer application is added between the database and the code that performs data updates and migration on data records of the database. The update and migration status of data retrieved for application query requests are determined, and back-level data records are identified based on a view of the original data records, generated subsequent to receiving instruction to initiate migration of data records. The back-level data records are migrated to a designated storage location, updated with changes associated with the migration, and requested records are provided to the requesting application. The accessor layer performs a consistent on-demand migration of data and includes a time-boxed cleanup mechanism that is triggered by exceeding a pre-determined threshold forcing migration of significantly smaller amounts of data untouched by query requests. Time-boxing is a terminology that allots a fixed maximum unit of time (i.e., making it temporary) for activity to complete.

In embodiments of the present invention, migration is performed on a transaction-by-transaction basis in order to maintain service and availability with only a minor impact to data handling, and at a point of exceeding a pre-determined threshold, which could be time-based, rate of migration based, or data percentage migrated based, a bulk migration is performed and may include consideration of a time window in which database activity is determined to be low demand levels.

In some embodiments, the accessor layer is a middleware application or is included in a middleware application and operates transparently to data query applications. The accessor layer removes the need for backward-compatible code at the application layer, and operates on a temporary basis, such that subsequent to migration completion, the accessor layer operation can be terminated or removed. In other embodiments that include a cloud environment, the accessor layer may be present to continually provide available migration services.

In some embodiments, the accessor layer performs a verification check to confirm all data records have been successfully migrated. In some embodiments, subsequent to performing the bulk migration of remaining untouched data records, an additional view is generated to identify records that have failed migration and are included in auto-generated data record requests that initiate migration operations of the identified data records. In response to confirming remaining records have been migrated, the migration is determined to be complete. In some embodiments, any error records are included in a notification to an administrator for investigation and resolution.

Figure 1:
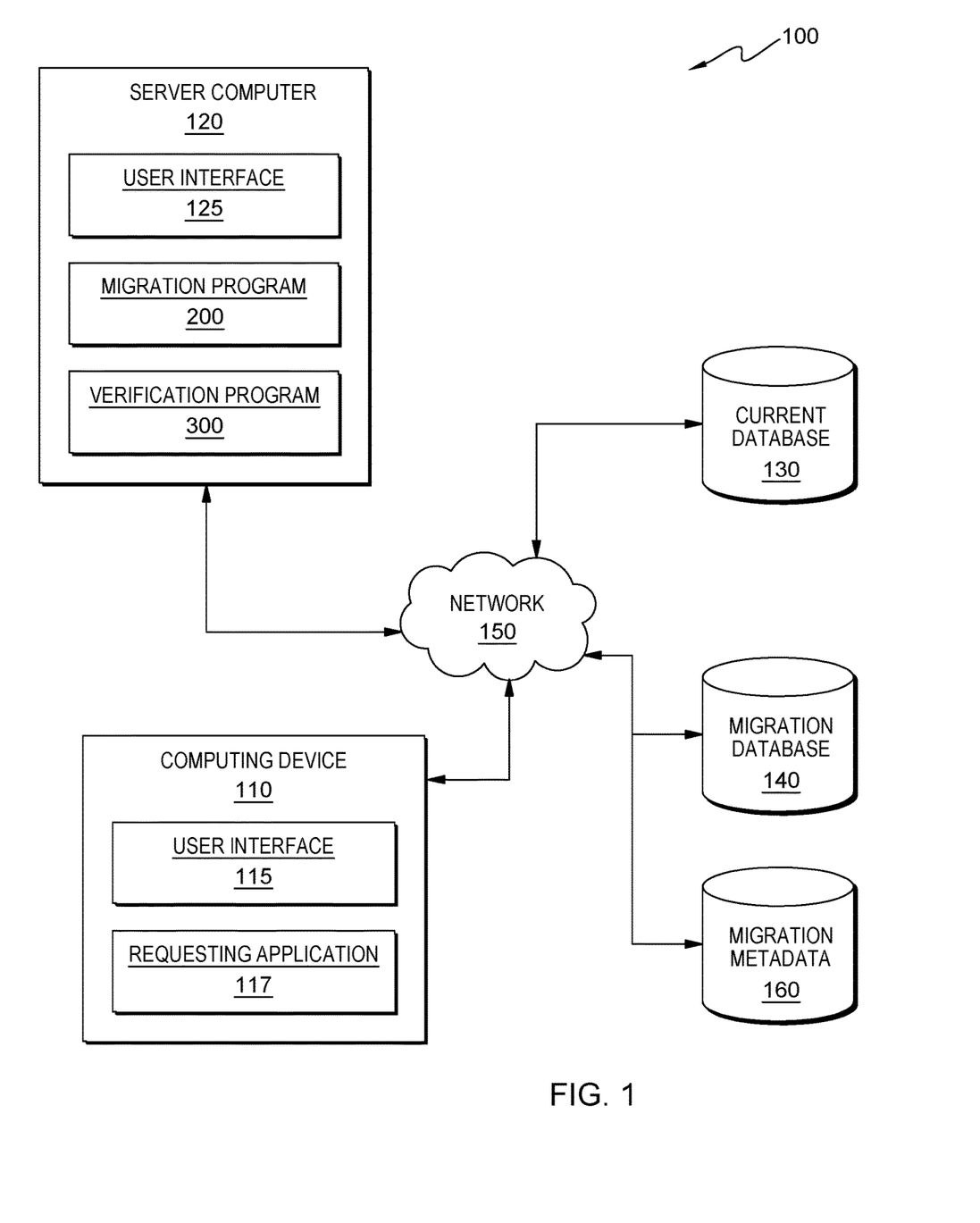
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110, server computer 120, current database 130, migration database 140, and migration metadata 160, all connected via network 150.

Network 150 can be, for example, a local area network (LAN), a telecommunications network, a wide area network (WAN), such as the Internet, a virtual local area network (VLAN), or any combination that can include wired, wireless, or optical connections. In general, network 150 can be any combination of connections and protocols that will support communications between computing device 110, server computer 120, current database 130, migration database 140, and migration metadata 160, in accordance with embodiments of the present invention.

Computing device 110 is a computing device that includes user interface 115 and is configured to submit requests and data queries to current database 130 via requesting application 117. Computing device 110 can be a standalone computing device, a smart phone, a tablet computer, a laptop computer, or any other electronic device or computing system capable of receiving, sending, and processing data. In other embodiments, computing device 110 can represent a computing device interacting with applications and services hosted and operating in a cloud computing environment. In another embodiment, computing device 110 can be a netbook computer, a desktop computer, a personal digital assistant (PDA), or other programmable electronic device capable of communicating with server computer 120, migration program 200, current database 130, and other computing devices (not shown) within distributed data processing environment 100 via network 150. In another embodiment, computing device 110 represents a computing system utilizing clustered computers and components (e.g., database server computers, application server computers, etc.) that act as a single pool of seamless resources when accessed within distributed data processing environment 100. Computing device 110 may include internal and external hardware components, depicted in FIG. 4.

User interface 115 provides users of computing device 110 an interface to access features and functions of computing device 110, including requesting application 117. In some embodiments of the present invention, user interface 115 provides access for requesting data records and submitting query requests for data in current database 130. User interface 115 also supports access to other applications, features, and functions of computing device 110. User interface 115 supports access to alerts, notifications, and other forms of communications. In one embodiment, user interface 115 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 115 may also be mobile application software that provides an interface to features and functions of computing device 110. User interface 115 enables a user of computing device 110 to receive, view/hear, and respond to input, access applications, and perform functions available on computing device 110.

Server computer 120 includes user interface 125, migration program 200, and verification program 300. In some embodiments of the present invention, server computer 120 can be a server computer, a blade computer, a laptop computer, a tablet computer, a netbook computer, or any other programmable electronic computing device capable of receiving, sending, and processing data, operating migration program 200 and verification program 300, and communicating via network 150 with computing device 110, requesting application 117 operating on computing device 110, current database 130, migration database 140, migration metadata 160, and other computing devices (not shown) within distributed data processing environment 100 via network 150. In other embodiments, server computer 120 can represent a virtual computing device operating based on multiple computers as a server system, such as in a cloud computing environment. In another embodiment, server computer 120 represents a computing system utilizing clustered computers and components (e.g., database server computers, application server computers, etc.) that act as a single pool of seamless resources when accessed within distributed data processing environment 100. Server computer 120 may include internal and external hardware components, as depicted and described in FIG. 4.

User interface 125 provides users of server computer 120 an interface to access features and functions of server computer 120, including migration program 200 and verification program 300. In some embodiments of the present invention, user interface 125 provides access for designating changes corresponding to migration of data records of current database 130 and designation of storage location of migrated data, such as stored in migration database 140. User interface 125 also supports access to other applications, features, and functions of server computer 120. User interface 125 supports access to alerts, notifications, and other forms of communications. In one embodiment, user interface 125 may be a graphical user interface (GUI) or a web user interface (WUI) and can receive user input and display text, documents, web browser windows, user options, application interfaces, and instructions for operation, and include the information (such as graphic, text, and sound) that a program presents to a user and the control sequences the user employs to control the program. In another embodiment, user interface 125 may also be mobile application software that provides an interface to features and functions of server computer 120. User interface 125 enables a user of server computer 120 to receive, view/hear, and respond to input, access applications, and perform functions available on server computer 120.

Migration program 200 is a middleware application, sometimes referred to as an accessor layer that operates between requesting application 117 of computing device 110 and the code that performs data updates and migration on data records of current database 130. In some embodiments of the present invention, migration program 200 receives instruction to migrate data records of current database 130 to a designated storage location of migration database 140. Migration program 200 generates a view of the data records of current database 130 that includes an identification of whether the respective data records of current database 130 have been migrated. In some embodiments, the generated view consolidates data from multiple tables of the database data records that are targeted for migration and includes version and/or access time stamp information to indicate the status of individual records with respect to the migration activity.

In response to receiving a request for records of the data records of current database 130, for example, from requesting application 117 operating on computing device 110, migration program 200 determines whether the requested records have been updated and migrated to migration database 140, based on the generated view, stored and maintained in migration metadata 160. In response to determining the requested records are back level, and have not been migrated to migration database 140, migration program 200 migrates the records, updating the records to the new version and storing the updated records in the designated storage location, such as migration database 140. Migration program 200 also updates the view of back level data records from current database 130 and stores the updated view in migration metadata 160.

Migration program 200 consistently migrates the data records of current database 130 by performing on-demand migration of respective record requests, with minimal impact to performance and database availability. The on-demand migration of migration program 200 includes a forced bulk migration of untouched data records of current database 130 by time-boxing the middleware accessor on-demand migration triggered by violating a configurable, pre-determined threshold metric associated with the on-demand migration. The pre-determined threshold may include but is not limited to one or a combination of: exceeding a time duration of on-demand migration, a rate of migration of the data records, a designated quantity of records remaining at a back-level status. In response to the on-demand migration of data records exceeding a pre-determined threshold of time (date, hours, etc.), or dropping below a pre-determined rate of migration of data records, or reaching a pre-determined count of un-migrated records, migration program 200 initiates a bulk migration of the remaining un-migrated records, having minimal impact on performance and availability due to the lower amount of data records to migrate. The hybrid combination of on-demand migration and bulk migration of significantly reduced quantities of un-migrated records offers a significant improvement to database migration operations for high availability requirement database system.

Verification program 300, similar to migration program 200, is part of a middleware application, sometimes referred to as an accessor layer that operates between requesting application 117 of computing device 110 and the code that performs data updates and migration on data records of current database 130. Verification program 300 performs a validation of data record migration completion, by initially recalling the view of data records, updated and maintained in migration metadata 160 and determines whether data records indicating a back-level version remain. Responsive to back-level version data records remaining, verification program 300 generates a simple query for the next back-level data record as determined from the maintained view of data records in migration metadata 160, which initiates the migration of the data record in a normal steady-state retrieve operation. The migrated new version record is stored in the designated storage location, and verification program 300 records the migration of the record to the new version by updating the view stored in migration metadata 160.

Verification program 300 determines if another record of the data records included in the view remain at a back-level version, and finding a next back-level record, verification program 300 repeats the above steps. In some embodiments, subsequent to verification program 300 determining that the view of data records indicates all records as migrated to the new version and stored in the designated location, verification program 300 generates a new view of the data records and determines if back-level data records remain as a confirmation of migration completion. In some embodiments, verification program 300 logs remaining back-level records that have not migrated as a result of previous steps and generates a notification to investigate and confirm the final state of remaining records. In some embodiments, subsequent to receiving confirmation verification program 300 provides indication that the new version data records stored in the designated location becomes the current database.

Current database 130 includes data records at a current version status prior to instruction to perform a migration of the data records. Subsequent to receiving a request to migrate the data records of current database 130, the data records are considered to be at a back-level status with respect to the attributes of the requested migration. Current database 130 may be a relational database, a document database, a hierarchical database, an object-oriented database, a distributed database, a network database, a graph database, a file system, or other storage structure organizing data for retrieval. In some embodiments migration of data records of current database 130 are updated and stored in a designated storage location that may be distinct from current database 130, such as migration database 140. In some embodiments, the designated storage location for migrated new version data records may be an alternate storage location within current database 130, or in yet other embodiments, the migrated new version data records may be stored in their original location within current database 130.

Migration database 140 includes data records at a new version status subsequent to migration program 200 initiating migration of records from current database 130. In some embodiments of the present invention, migration database 140 is a distinct from current database 130. Migration database 140 may be distinct tables within current database 130, a distinct database operating on the same or a separate server than current database 130, located on separate hardware on a different platform, part of a distributed storage system in a cloud environment. In other embodiments, migration database 140 may be a collection of data records migrated to a new version but located in their original storage location within current database 130. Data records stored in migration database 140 are at a new version status with respect to the attributes of the requested migration. Migration database 140 may be a relational database, a document database, a hierarchical database, an object-oriented database, a distributed database, a network database, a graph database, a file system, or other storage structure organizing data for retrieval.

Migration metadata 160 includes metadata associated with the migration of data records of current database 130 to migration database 140. The metadata includes the version status of data records of current database 130, and updates to the version status and storage location of the data records associated with the migration of data records. Migration metadata 160 includes one or more views referenced by migration program 200 and verification program 300 to identify the records that remain at a back-level status (and in some embodiments confirming the records migrated to a new version status).

Migration metadata 160 includes logging of records that remain at a back-level status subsequent to on-demand migration corresponding to record query requests, and bulk migration subsequent to detecting violation of a pre-determined threshold. Migration metadata 160 logs records that remain at a back-level status subsequent to explicit record retrieval requests, identifying the records for verification program 300 to initiate notification for manual investigation, prior to confirmation of migration completion. In some embodiments, the views included in migration metadata 160 are maintained and updated within memory of server computer 120. In other embodiments, the views are stored in migration metadata 160 and accessed by migration program 200 and verification program 300.

Figure 2:
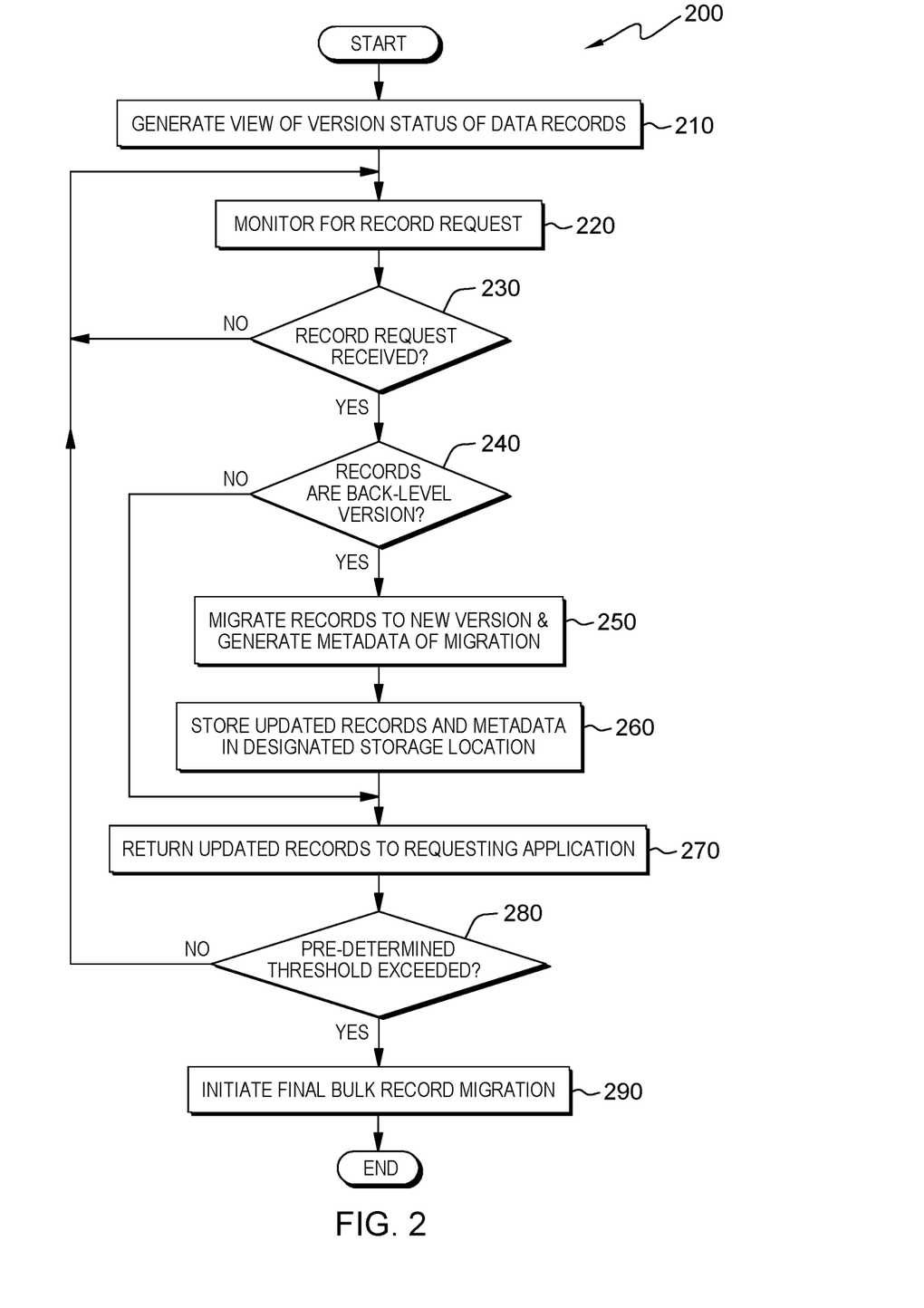
FIG. 2 is a flowchart illustrating the operational steps of a migration program operating within the distributed data processing environment of FIG. 1, in accordance with an embodiment of the present invention.

FIG. 2 illustrates is a flowchart illustrating the operational steps of migration program 200 operating within the distributed data processing environment of FIG. 1, in accordance with an embodiment of the present invention. Subsequent to receiving confirmation to migrate data records of a storage and retrieval structure (hereafter generically referred to as a/the database) migration program 200 generates a view of the version status of data records in the current database (step 210). Migration program 200 generates a view that includes the data records of the database selected for migration. Migration program 200 references the generated view in subsequent steps to determine the version status of each record as record requests are received from a requesting application. The view identifies which records have been migrated, referred to as at a new version status, and which records remain un-migrated, which are also referred to as at a back-level version status.

For example, migration program 200 generates a view that includes the version status of data records of current database 130 and refers to the view to identify whether records requested by requesting application 117 have been migrated (new version) or whether the requested records remain at a back-level version status. The generated view is updated to reflect the version status of records as on-demand migration is performed in conjunction with received record requests. In some embodiments, migration program 200 stores the updated view in migration metadata 160.

Migration program 200 monitors for receipt of data retrieval requests (step 220). In some embodiments of the present invention, migration program 200 continuously monitors for receipt of a request for records from the data records of a current database. In some embodiments, migration program 200 remains in a listening mode until a record request is received from an application accessing the current database. For example, migration program 200 listens for a request for records of data records included in current database 130 from requesting application 117 operating on computing device 110.

Migration program 200 determines whether a record request has been received (decision step 230). For the case in which migration program 200 determines that a request for record retrieval has not been received (step 230, "NO" branch), migration program 200 returns to step 220 and monitors for data requests. For the case in which migration program 200 determines that a request for record retrieval has been received (step 230 "YES" branch), migration program 200 determines whether the requested records are at a back-level version (decision step 240). For example, migration program 200 determines that a request for one or more records from the data records included in current database 130 is received via network 150 from requesting application 117 operating on computing device 110.

For the case in which migration program 200 determines that the requested records are migrated to the new version status (step 240 "NO" version), migration program 200 proceeds to step 270, retrieving the requested records and returning the records to the requesting application. For example, migration program 200 receives a request for records from the data records of current database 130 and identifies that the requested records are at a new version status by referencing the view generated from current database 130, stored in migration metadata 160. Migration program 200 proceeds to step 270 and returns the retrieved records, which are at the new version status, to requesting application 117.

For the case in which migration program 200 determines that the requested records are at a back-level status (step 240 "YES" branch), migration program 200 performs a migration of the records to the new version and generates metadata of the migration (step 250). Migration program 200 references the view generated from current database 130 and identifies that the requested records are at a back-level version status and proceeds to migrate the requested records making changes associated with the new version status and generates metadata associated with the migration changes of the records. For example, migration program 200 determines records requested by requesting application 117 operating on computing device 110 are at a back-level status by referencing the generated view from current database 130, which is stored in migration metadata 160 and reflects updated status of data records. Migration program 200 performs the changes associated with the migration of the requested records and generates metadata associated with the migration changes.

Having performed the migration changes to the requested records, migration program 200 stores the updated records and metadata in designated storage locations (step 260). Migration program 200 stores the migrated records corresponding to the queries by requesting application 117 in a designated storage location and updates the generated view of data records of current database 130. The updated view includes the generated metadata from the record migration and is stored in a designated storage location, such as migration metadata 160. In some embodiments of the present invention, the designated storage location is a distinct database, such as migration database 140. Migration database 140 may be physically located on a separate system or different platform, or within a distributed storage cloud environment. In other embodiments, migration database 140 may be a separate database located within the physical system of current database 130, or the designated storage location may include storing the new version status of records in the same location within current database 130.

Having performed the migration, stored the records and metadata of the migration in the designated storage locations, migration program 200 returns the requested records to requesting application 117 from the new location (step 270), which includes the changes made to the records by performing the migration.

Migration program 200 continues operations of on-demand migration of requested data records that are identified as back-level version status. During continued operation, migration program 200 determines whether a pre-determined threshold is exceeded (decision step 280). Exceeding the threshold, in which the particular selected metric of pre-determined threshold is violated, triggers a forced non-blocking, asynchronous bulk migration of data records that remain at a back-level version status after pre-determined conditions have been met. In some embodiments of the present invention, the pre-determined threshold can be a rate of record migration falling below a specified level of migration. A rate of record migration would be determined by summarizing the quantity of records migrated within a consistent unit of time. For example, a pre-determined threshold of migration rate may be 100 records migrated per hour. If the rate of migration fell below the pre-determined threshold migration rate, presumably indicating that a large portion of data records of the database have been successfully migrated, the bulk migration action would be initiated.

In some embodiments, the pre-determined threshold may be a specified period of time, such as a specific number of days or hours. For example, subsequent to initiating the migration of data records of current database 130, migration program 200 tracks the duration of the threshold time period, and subsequent to the time period expiring, migration program 200 initiates the bulk migration of remaining back-level version data records.

In yet other embodiments, the pre-defined threshold may be a specified percentage of data records that have been successfully migrated. For example, subsequent to initiating the migration of data records of current database 130, migration program 200 tracks the quantity of records migrated to the new version status and compares the quantity to the total number of records of the generated view of current database 130. At a point at which the percentage of migrated records exceeds the pre-determined threshold percentage, migration program 200 initiates the bulk migration of remaining back-level version records. The setting a pre-defined percentage anticipates a major portion of data record migration during on-demand migration operations, leaving minimal impact to the database during the bulk migration of the remaining percentage. In some embodiments, the initiation of the bulk migration of remaining back-level version records includes consideration of a time of day at which database record requests are known to be low, reducing database access and performance impacts.

For the case in which migration program 200 determines no violation of the pre-determined threshold (step 280 "NO" branch), migration program 200 returns to step 220 and monitors for record retrieval requests. Migration program 200 determines that the pre-defined threshold, such as a threshold of migration rate, period of time, or percentage of un-migrated records, has not been violated, and continues to perform an on-demand migration of records of current database 130 as back-level version records are requested by requesting application 117. Migration program 200 returns to step 220 and monitors for record requests and proceeds as described above for step 220 and subsequent steps.

For the case in which migration program 200 determines that the pre-determined threshold is violated (step 280 "YES" branch), migration program 200 initiates a final bulk record migration (step 290). Migration program 200 performs a migration on the remaining records determined as a back-level version by referencing the view of data records, updated for each record migration and stored in migration metadata 160. In some embodiments, for each on-demand record migration, the metadata associated with the migrated records updates the version status in the generated view of current database 130. Migration program 200 references the view and identifies the remaining records at a back-level version status and performs a bulk migration on the identified remaining records. In some embodiments, the bulk migration is performed consistent with know low-demand periods associated with current database 130. Having completed the final bulk record migration, migration program 200 ends.

Figure 3:
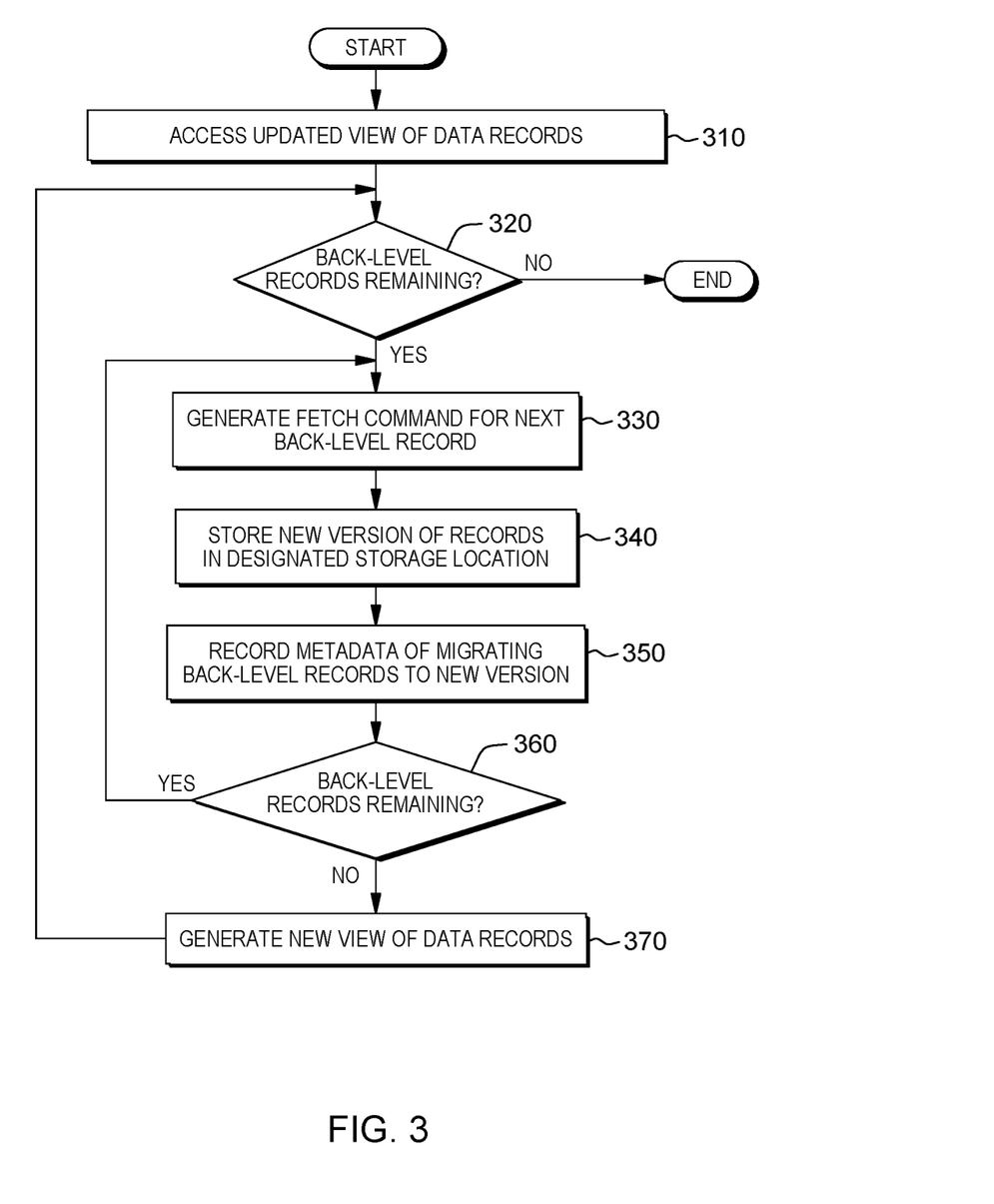
FIG. 3 is a flowchart illustrating the operational steps of a verification program operating within the distributed data processing environment of FIG. 1, in accordance with an embodiment of the present invention.

FIG. 3 is a flowchart illustrating the operational steps of verification program 300 operating within the distributed data processing environment of FIG. 1, in accordance with an embodiment of the present invention. Verification program 300 determines completion of the migration of data records by determining whether back-level, un-migrated data records remain in the target database. If found, verification program 300 initiates fetch commands for the respective remaining records, forcing migration activity.

Subsequent to performing a bulk migration of remaining data records, verification program 300 accesses the updated view of data records (step 310). The view generated in step 210 of migration program 200 is continually updated to reflect the version status of data records as respective records are updated and migrated. Verification program 200 accesses the view, which in some embodiments is maintained in memory of server computer 120. In other embodiments, the updated view is stored in migration metadata 160 and accessed by verification program 300.

Verification program 300 determines whether back-level records remain as indicated by the view updated subsequent to the bulk migration of remaining data records (decision step 320). Verification program 300 determines whether the view includes back-level version records after the bulk migration (step 290 of migration program 200) is performed. For the case in which no back-level records remain as un-migrated (step 320 "NO" branch), verification program 300 ends. For the case in which verification program 300 determines that un-migrated, back-level version records remain (step 320 "YES" branch), verification program 300 generates a fetch command for the next back-level version record (step 330). The fetch command requests the specific back-level version record, as determined from the updated view, and initiates the on-demand migration process described in step 240 through step 270 of migration program 200 migrating the record to the new version updates.

Having generated a fetch command for the back-level version next record, verification program 300 performs updates to the record associated with the migration and stores the new version of the record in a designated storage location (step 340). For example, verification program 300 updates a back-level version record of current database 130 to the new version status and stores the updated version of the record in migration database 140.

Verification program 300 records the metadata of migrating the back-level version record to the new version (step 350). Verification program 300 updates the view accessed in step 310 to reflect the migration update of the record from the back-level version to the new version and records the designated storage location, such as migration database 140, as the location in which the record is stored.

Verification program 300 determines whether back-level records remain (decision step 360). For the case in which verification program 300 determines that no additional back-level version records remain (step 360 "NO" branch), verification program 300 proceeds to step 370 and generates a new view of the data records (step 370).

For the case in which verification program 300 determines that additional back-level version records remain (step 360 "YES" branch), verification program 300 returns to step 330 and generates a fetch command for the next back-level version record identified and proceeds as discussed above.

Returning to step 370 in which verification program 300 generates a new view of data records that includes versioning and/or timestamp information indicating whether the records have been migrated to a new version status, or whether records remain un-migrated at a back-level version. In some embodiments of the present invention, the new view of data records is held in memory of server computer 120. In other embodiments, the new view is stored in migration metadata 160 and accessed by verification program 300 operating on server computer 120. Verification program generates the new view of data records and proceeds to step 320 to determine whether back-level records remain and proceeds as described above.

In some embodiments of the present invention, if one or more un-migrated data records are detected subsequent to additional fetch commands to force migration of the data record, verification program 300 identifies the data record by creating a log record and notification of the one or more un-migrated data records remaining to a user to investigate and confirm the final state of the one or more un-migrated data records. In some embodiments, the user performs manual actions to complete migration of remaining un-migrated data records and indicates a confirmation of the final state of data records. In some embodiments, having received a final confirmation of data record migration, verification program 300 designates the pre-determined storage location of the new version of the data records as the current live version of the data records.

Figure 4:
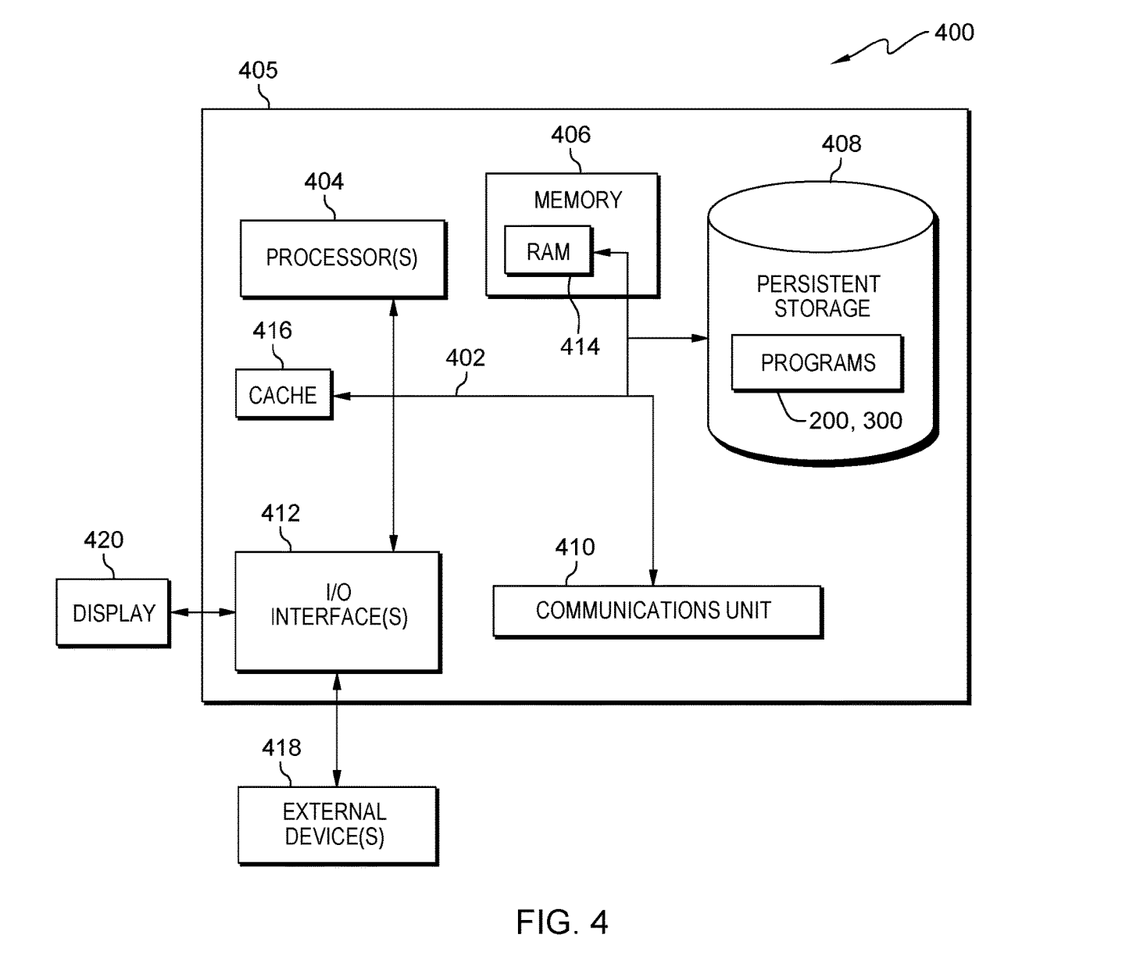
FIG. 4 depicts a block diagram of components of a computing system, including a computing device capable of operationally performing the migration program of FIG. 2 and the verification program of FIG. 3, in accordance with an embodiment of the present invention.

FIG. 4 depicts a block diagram of components of computing system 400, including a computing device 405 capable of operationally including or connecting to components depicted in FIG. 1, and performing migration program 200 of FIG. 2 and verification program 300 of FIG. 3, in accordance with an embodiment of the present invention.

Computing device 405 includes components and functional capability similar to computing device 110 and server computer 120 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

In one embodiment, migration program 200 and verification program 300 are stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Migration program 200 and verification program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention, e.g., migration program 200 and verification program 300 can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for reducing downtime of a database migration, the method comprising:
responsive to receiving confirmation to migrate data records of a first database from a back-level version of the data records to a new version of the data records, one or more processors generating a view identifying the back-level version of the data records of the first database;

the one or more processors receiving a query from an application requesting a first set of records of the data records of the first database;

the one or more processors determining whether the requested first set of records have been migrated to the new version of the data records, based on the generated view identifying the back-level version of the data records;

responsive to determining the requested first set of records remain in the back-level version, the one or more processors performing a migration of the requested first set of records that includes changing the requested first set of records to the new version of the first set of records;

the one or more processors identifying the requested first set of records as changed to the new version of the data records and updating the view identifying the back-level version of the data records of the first database;

the one or more processors writing the new version of the first set of records to a pre-determined storage location; and the one or more processors providing the requested first set of records that are migrated to the new version to the application submitting the query.

2. The method of claim 1, further comprising:

the one or more processors determining whether a pre-determined threshold of progress towards migration of the back-level version of the data records of the first database is violated;

in response to determining the pre-determined threshold has been violated, the one or more processors generating an asynchronous non-blocking command to migrate the data records of the first database in the back-level version to the new version of the data records; and the one or more processors writing the new version of the data records to the pre-determined storage location.

3. The method of claim 1, wherein the pre-determined storage location is a current location of the data records of the first database.

4. The method of claim 1, wherein the pre-determined storage location is distinct from the first database and includes the new version of the requested first set of records associated with the migration of the first set of records.

5. The method of claim 1, further comprising:

the one or more processors determining whether a pre-determined threshold of progress towards migration of the back-level version of the data records of the first database is violated, wherein violating the pre-determine threshold includes exceeding a time period;

in response to determining the pre-determined threshold has been violated, the one or more processors generating an asynchronous non-blocking command to migrate the data records of the first database that remain at the back-level version, which includes changing the data records to the new version of the data records; and the one or more processors writing the data records changed to the new version of the data records to the pre-determined storage location.

6. The method of claim 1, further comprising:

the one or more processors determining whether a rate of change of migrating the back-level version of the data records to the new version of the data records falls below a pre-determined threshold;

in response to determining the rate of change of migration of the back-level version of the data records to the new version has fallen below the pre-determined threshold, the one or more processors generating an asynchronous non-blocking command to migrate data records of the first database, which includes changing the data records to the new version of the data records; and the one or more processors writing the data records changed to the new version of the data records to the pre-determined storage location.

7. The method of claim 1, further comprising:

the one or more processors determining whether a pre-determined threshold of progress towards migration of the back-level version of the data records of the first database to the new version of the data records of the first database is violated, wherein violating the pre-determined threshold includes exceeding a percentage of the data records migrated to the new version;

in response to determining the pre-determined threshold has been violated, the one or more processors generating an asynchronous non-blocking command to migrate the data records of the first database that remain un-migrated and at the back-level version to the new version of the data records; and the one or more processors writing the data records changed to the new version of the data records to the pre-determined storage location.

8. The method of claim 1, further comprising:

responsive to generating an asynchronous non-blocking command to migrate the data records of the first database that are un-migrated and remain at the back-level version, the one or more processors generating a view identifying the un-migrated data records of the first database which are at the back-level version;

responsive to identifying one or more un-migrated data records, the one or more processors performing a query of the one or more un-migrated data records;

the one or more processors creating a log record and notification of the one or more un-migrated data records that remain at the back-level version;

the one or more processors transmitting the notification to a user investigating a confirmation of a final state of the one or more un-migrated data records; and responsive to receiving from the user, the confirmation of the final state of the one or more un-migrated data records, designating the new version of the data records and the pre-determined storage location of the new version of the data records as a current live version of the data records.

9. A computer program product for minimizing downtime of a database migration, the computer program product comprising:

one or more computer readable storage media and program instructions stored on the one or more computer readable storage media, the program instructions comprising:

program instructions to generate a view identifying a back-level version of data records of a first database in response to receiving confirmation to migrate the data records of the first database from the back-level version of the data records to a new version of the data records;

program instructions to receive a query from an application requesting a first set of records of the data records of the first database;

program instructions to determine whether the requested first set of records have been migrated to the new version of the data records, based on the generated view identifying the back-level version of the data records;

responsive to determining the requested first set of records remain in the back-level version, program instructions to perform a migration of the requested first set of records that includes changing the requested first set of records to the new version of the first set of records;

program instructions to identify the requested first set of records as changed to the new version of the data records and update the view identifying the back-level version of the data records of the first database;

program instructions to write the new version of the first set of records to a pre-determined storage location; and program instructions to provide the requested first set of records that are migrated to the new version to the application submitting the query.

10. The computer program product of claim 9, further comprising:

program instructions to determine whether a pre-determined threshold of progress towards migration of the back-level version of the data records of the first database is violated;

in response to determining the pre-determined threshold has been violated, program instructions to generate an asynchronous non-blocking command to migrate data records of the first database in the back-level version to the new version of the data records; and program instructions to write the new version of the data records to the pre-determined storage location.

11. The computer program product of claim 9, further comprising:

program instructions to determine whether a pre-determined threshold of progress towards migration of the back-level version of the data records of the first database is violated, wherein violating the pre-determined threshold includes exceeding a designated duration of time;

in response to determining the pre-determined threshold has been violated, program instructions to generate an asynchronous non-blocking command to migrate data records of the first database to the changes resulting in the new version of the data records; and program instructions to write the data records changed to the new version of the data records to the pre-determined storage location.

12. The computer program product of claim 9, further comprising:

program instructions to determine whether a rate of change of migrating the back-level version of the data records to the new version of the data records falls below a pre-determined threshold;

in response to determining the rate of change of the data records migrated to the new version has fallen below the pre-determined threshold, program instructions to generate an asynchronous non-blocking command to migrate data records of the first database, which includes changing the data records to the new version of the data records; and program instructions to write the data records changed to the new version of the data records to the pre-determined storage location.

13. The computer program product of claim 9, further comprising:

program instructions to determine whether a pre-determined threshold of progress towards migration of the back-level version of the data records of the first database to the new version of the data records of the first database is violated, wherein violating the pre-determined threshold includes exceeding a percentage of the data records migrated to the new version;

in response to determining the pre-determined threshold has been exceeded, program instructions to generate an asynchronous non-blocking command to migrate the data records of the first database that remain un-migrated and at the back-level version to the new version of the data records; and program instructions to write the data records changed to the new version of the data records to the pre-determined storage location.

14. The computer program product of claim 9, further comprising:

responsive to generating an asynchronous non-blocking command to migrate the data records of the first database that are un-migrated and remain at the back-level version, program instructions to generate a view identifying un-migrated data records of the first database;

responsive to identifying one or more un-migrated data records, program instructions to perform a query of the one or more un-migrated data records;

program instructions to create a log record and notification of the one or more un-migrated data records;

program instructions to transmit the notification to a user investigating a confirmation of a final state of the one or more un-migrated data records; and responsive to receiving from the user, the confirmation of the final state of the one or more un-migrated data records, program instructions to designate the new version of the data records and the pre-determined storage location of the new version of the data records as a current live version of the data records.

15. A computer system for minimizing downtime of a database migration, the computer system comprising:

one or more computer processors;

one or more computer readable storage media; and program instructions stored on the one or more computer readable storage media, the program instructions comprising:

program instructions to generate a view identifying a back-level version of data records of a first database in response to receiving confirmation to migrate the data records of the first database from the back-level version of the data records to a new version of the data records;

program instructions to receive a query from an application requesting a first set of records of the data records of the first database;

program instructions to determine whether the requested first set of records have been migrated to the new version of the data records, based on the generated view identifying the back-level version of the data records;

responsive to determining the requested first set of records remain in the back-level version, program instructions to perform a migration of the requested first set of records that includes changing the requested first set of records to the new version of the first set of records;

program instructions to identify the requested first set of records as changed to the new version of the data records and update the view identifying the back-level version of the data records of the first database;

program instructions to write the new version of the first set of records to a pre-determined storage location; and program instructions to provide the requested first set of records that are migrated to the new version to the application submitting the query.

16. The computer system of claim 15, further comprising:

program instructions to determine whether a pre-determined threshold of progress towards migration of the back-level version of the data records of the first database to the new version of the data records is violated;

in response to determining the pre-determined threshold has been violated, program instructions to generate an asynchronous non-blocking command to migrate data records of the first database in the back-level version to the new version of the data records; and program instructions to write the new version of the data records to the pre-determined storage location.

17. The computer system of claim 15, wherein the pre-determined storage location is a current location of the data records of the first database and includes changes associated with the migration of the first set of records.

18. The computer system of claim 15, wherein the pre-determined storage location is distinct from the first database.

19. The computer system of claim 16, wherein the program instructions to determine whether the pre-determined threshold is violated includes a pre-determined threshold selected from a group consisting of: dropping below a pre-determined rate of change of the data records migrated to the new version, exceeding a percentage of the data records migrated to the new version, and a designated period of time in which the data records of the first database are migrated to the new version of data records, based on application queries for sets of records from the data records of the first database.

20. The computer system of claim 15, further comprising:

responsive to generating an asynchronous non-blocking command to migrate the data records of the first database that are un-migrated and remain at the back-level version, generating a view identifying un-migrated data records;

responsive to identifying one or more un-migrated data records, performing a query of the one or more un-migrated data records;

transmitting a notification to a user investigating a confirmation of a final state of the one or more un-migrated data records; and responsive to receiving from the user, the confirmation of the final state of the one or more un-migrated data records, designating the new version of the data records and the pre-determined storage location of the new version of the data records as a current live version of the data records.

* * * * *